US012600091B2

(12) United States Patent
Kusaka et al.

(10) Patent No.:  US 12,600,091 B2
(45) Date of Patent:  Apr. 14, 2026

(54) OPTICAL SHAPING DEVICE AND MANUFACTURING METHOD

(71) Applicant: Fujikura Ltd., Tokyo (JP)

(72) Inventors: Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 174 days.

(21) Appl. No.: 18/262,374

(22) PCT Filed: Dec. 1, 2021

(86) PCT No.: PCT/JP2021/044008

§ 371 (c)(1),
(2) Date: Jul. 20, 2023

(87) PCT Pub. No.: WO2022/176313

PCT Pub. Date: Aug. 25, 2022

(65) Prior Publication Data

US 2024/0075686 A1      Mar. 7, 2024

(30) Foreign Application Priority Data

Feb. 19, 2021    (JP) ................................. 2021-025678

(51) Int. Cl.
| | |
|---|---|
| *B29C 64/264* | (2017.01) |
| *B29C 64/124* | (2017.01) |
| *B29C 64/393* | (2017.01) |
| *B33Y 10/00* | (2015.01) |
| *B33Y 30/00* | (2015.01) |

(Continued)

(52) U.S. Cl.
CPC .......... *B29C 64/264* (2017.08); *B29C 64/124* (2017.08); *B29C 64/393* (2017.08);

(Continued)

(58) Field of Classification Search
CPC ... B29C 64/129; B29C 64/135; B29C 64/264; B29C 64/268; B29C 64/273;

(Continued)

(56) References Cited

U.S. PATENT DOCUMENTS

| | | | | |
|---|---|---|---|---|
| 2022/0227050 A1* | 7/2022 | Steege | .................. | B29C 64/188 |
| 2022/0363010 A1* | 11/2022 | Kostenko | .............. | B29C 64/286 |

FOREIGN PATENT DOCUMENTS

| | | |
|---|---|---|
| JP | 2003-001599 A | 1/2003 |
| JP | 2003-340923 A | 12/2003 |

(Continued)

OTHER PUBLICATIONS

Qiang Geng et al., "Ultrafast Multi-Focus 3-D Nano-Fabrication Based on Two-Photon Polymerization," Nature Communications (2019) 10:2179 (7 pages).

(Continued)

*Primary Examiner* — Philip C Tucker
*Assistant Examiner* — Jimmy R Smith, Jr.
(74) *Attorney, Agent, or Firm* — Osha Bergman Watanabe & Burton LLP

(57) ABSTRACT

An optical fabrication device includes a light source that emits light and cures a photo-curable resin, a digital micromirror device that reflects the light and projects a predetermined pattern, a microlens array disposed downstream of the digital micromirror device and that transmits the light that has been reflected by the digital micromirror device, an objective disposed downstream of the microlens array and that causes the light that has been transmitted through the microlens array to form an image, a container that holds the photo-curable resin, a sample platform disposed inside the container, and a controller that controls the digital micromirror device and causes the light to form an image having the predetermined pattern at each of levels that are different in distance from a main face of the sample platform.

2 Claims, 3 Drawing Sheets

(51) Int. Cl.
    *B33Y 50/02*      (2015.01)
    *G02B 26/08*     (2006.01)

(52) U.S. Cl.
    CPC .............. *B33Y 10/00* (2014.12); *B33Y 30/00*
          (2014.12); *B33Y 50/02* (2014.12); *G02B*
                       *26/0833* (2013.01)

(58) Field of Classification Search
    CPC ... B29C 64/277; B29C 64/282; B29C 64/286;
                    B29C 64/291; B29C 71/04
    See application file for complete search history.

(56)               References Cited

FOREIGN PATENT DOCUMENTS

| | | |
|---|---|---|
| JP | 2004-006440 A | 1/2004 |
| WO | 2016/075802 A1 | 5/2016 |

OTHER PUBLICATIONS

Pawel Fiedor et al., "A New Approach to Micromachining: High-Precision and Innovative Additive Manufacturing Solutions Based on Photopolymerization Technology," Materials 2020, 13, 2951 (25 pages).
Written Opinion of International Searching Authority issued in corresponding International Application No. PCT/JP2021/044008 mailed Feb. 1, 2022 (8 pages).
International Search Report issued in corresponding International Application No. PCT/JP2021/044008 mailed Feb. 1, 2022 (2 pages).

* cited by examiner

OPTICAL SHAPING DEVICE AND MANUFACTURING METHOD

BACKGROUND

Technical Field

The present invention relates to an optical fabrication device and a method for manufacturing an optically fabricated object.

Description of the Related Art

Projection stereolithography in which light that has been subjected to patterning is projected by means of a digital micromirror device (DMD), instead of a scanner, has been known. Such stereolithography may also be called digital light processing (DLP). Further, the DLP may employ two-photon polymerization (TPP) to cure a photo-curable resin in a smaller region. FIG. 18 of Non-Patent Literature 1 and FIG. 1 of Non-Patent Literature 2 disclose optical fabrication devices employing the DLP or the TPP.

Non-Patent Literature

Non-patent Literature 1: Pawel Fiedor et. al., "A New Approach to Micromachining: High-Precision and Innovative Additive Manufacturing Solutions Based on Photopolymerization Technology", Materials 2020, 13, 2951.
Non-patent Literature 2: Qiang Geng et. al., "Ultrafast multi-focus 3-D nano-fabrication based on two-photon polymerization" NATURE COMMUNICATIONS (2019)10:2179.

In such optical fabrication devices described above, a three-dimensional optically fabricated object is manufactured by curing a photo-curable resin on a layer-by-layer basis. Thus, such optical fabrication devices use a stage configured to move in at least one axial direction to raise or lower a sample platform on which an optically fabricated object is manufactured.

SUMMARY

One or more embodiments provide an optical fabrication device and a manufacturing method, capable of fabricating a three-dimensional optically fabricated object, without the use of a stage for raising or lowering a sample platform.

An optical fabrication device according to one or more embodiments includes: a light source configured to emit light for curing a photo-curable resin; a digital micromirror device configured to reflect the light to project a predetermined pattern; a microlens array disposed downstream of the digital micromirror device and configured to transmit the light that has been reflected by the digital micromirror device; an objective disposed downstream of the microlens array and configured to cause the light that has been transmitted through the microlens array to form an image; a container configured to hold a photo-curable resin; a sample platform disposed inside the container; and a control section (example of a controller) configured to control the digital micromirror device to cause the light to form an image having a predetermined pattern at each of a plurality of levels that are different in distance from a main face of the sample platform.

A method according to one or more embodiments includes manufacturing an optically fabricated object by causing light having a predetermined pattern to form an image at each of first to n-th levels (n is an integer that is not less than 2) that are different in distance from a main face of a sample platform located in the photo-curable resin. The method includes: a controlling step of controlling a digital micromirror device to cause the light to form an image having the predetermined pattern at an i-th level (i is an integer that satisfies $1 \leq i \leq n$); and an irradiation step of irradiating the i-th level with the light by using the digital micromirror device controlled in the controlling step, the controlling step and the irradiation step being repeated until i goes from 1 to n, to fabricate at least part of the optically fabricated object.

According to one or more embodiments, it is possible to provide an optical fabrication device capable of fabricating a three-dimensional optically fabricated object, without the use of a stage for raising or lowering a sample platform.

DESCRIPTION OF THE EMBODIMENTS

Figure 1:
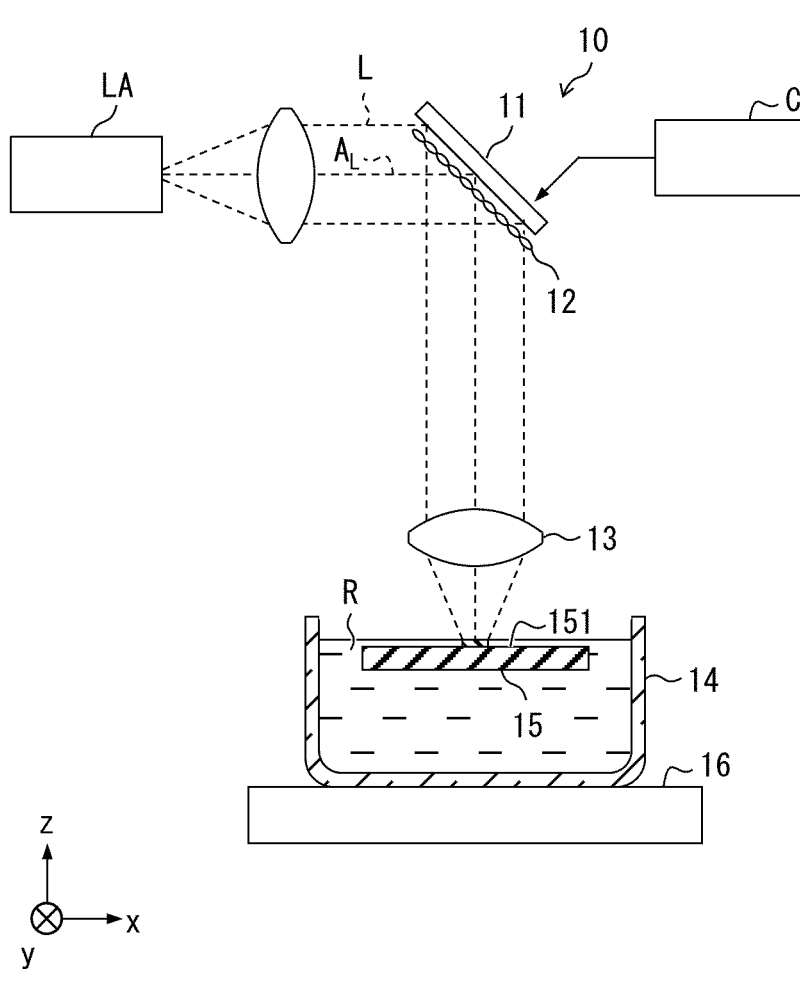
FIG. 1 is a schematic view illustrating an optical fabrication device in accordance with one or more embodiments.
Figure 2:
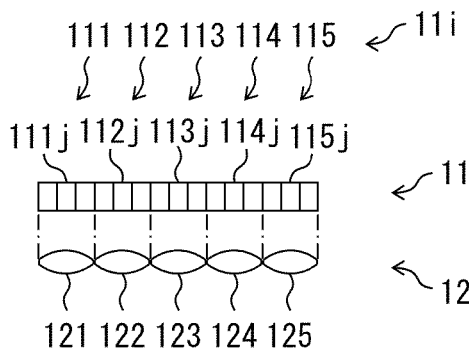
FIG. 2 is a schematic view illustrating a digital micromirror device and a microlens array, which are included in the optical fabrication device illustrated in FIG. 1.
Figure 3:
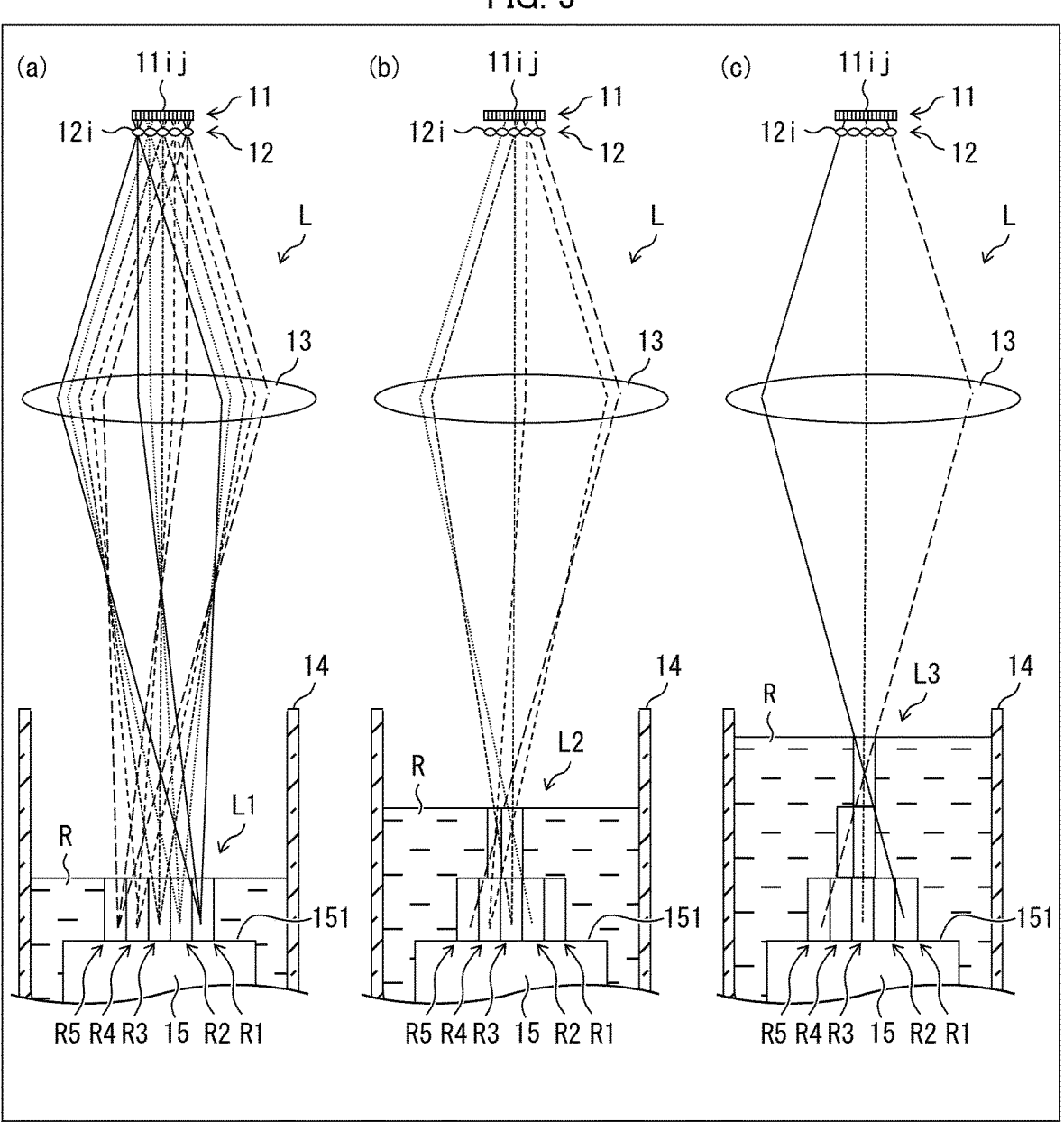
FIG. 3 is a schematic view illustrating a corresponding one of steps of optically fabricating first to third layers, using the optical fabrication device illustrated in FIG. 1.

[Stereolithography Device]
The following will describe the configuration of a stereolithography device 10 in accordance with one or more embodiments, with reference to FIGS. 1 to 3. FIG. 1 is a schematic view illustrating the stereolithography device 10. FIG. 2 is a schematic view illustrating a digital micromirror device (DMD) 11 and a microlens array 12, which are included in the stereolithography device 10.
<Configuration>
The stereolithography device 10 includes a laser device LA, the DMD 11, the microlens array 12, a lens 13, a container 14, a sample platform 15, a stage 16, and a control section C (see (a) of FIG. 1). The stereolithography device 10 is an example of an optical fabrication device. Each of (a) to (c) of FIG. 3 is a schematic view illustrating a corresponding one of steps of optically fabricating first to third layers L1 to L3, using the stereolithography device 10.
(Laser Device)
The laser device LA, which is an example of a laser light source, is configured to emit a laser that produces light L to which a photo-curable resin R is exposed. Thus, the laser device LA includes a semiconductor module configured to emit light L having a wavelength $\lambda$ of 405 nm. It should be noted that one or more embodiments employ the light L having a wavelength $\lambda$ of 405 nm to cure the photo-curable resin R; however, two-photon polymerization (TPP) may be used to cure the photo-curable resin R. In such a case, two laser devices LA each configured to emit light L having a wavelength $\lambda$ of 810 nm may be used. The energy of light having a wavelength $\lambda$ of 810 nm corresponds to half of the energy of light having a wavelength $\lambda$ of 405 nm, which is capable of curing the photo-curable resin R. Further, in a case in which TPP is used to cure the photo-curable resin R, the laser device LA emits the light having a pulse width on the order of femtoseconds.

The light L emitted from the laser device LA undergoes conversion from diverging light to collimated light, which is illustrated in FIG. 1, by means of a collimating optical system including a lens. Here, FIG. 1 depicts the central axis of a bundle of rays of the light L as an optical axis $A_L$. The optical axis $A_L$ corresponds to an optical path through which a chief ray of the light L travels.

In FIG. 1, a vertically upward direction orthogonal to the surface of a liquid photo-curable resin R (i.e., the horizontal plane) is defined as a positive z-axial direction, a propagation direction of light L before being incident on the DMD 11 is defined as a positive x-axis direction, and a direction constituting the right-handed orthogonal coordinate system with the positive x-axial direction and the positive z-axial direction is defined as a positive y-axial direction.

(Digital Micromirror Device)

The DMD 11 includes a plurality of mirrors 11*ij* arranged in a matrix pattern. In the schematic view of FIG. 2, i is an integer that satisfies 1≤i≤5, and j is an integer that satisfies 1≤j≤3. That is, the DMD 11 schematically illustrated in one or more embodiments includes 15 rows and 15 columns of 11*ij*. Here, the mirrors 11*ij* are identical in configuration. The reason why the 15 mirrors are grouped into five mirror groups 11*i* by using i is to facilitate understanding as to the correspondence between the mirrors and the microlenses 12*i* of the microlens array 12. Further, the reason why the number of rows and the number of columns of the mirrors constituting the DMD 11 are set to 15 rows and 15 columns (hereinafter, referred to as "15×15") is to merely schematically illustrate the stereolithography device 10. The number of rows and the number of columns of an actually employed DMD 11 are much more than 15. Examples of the number of rows and the number of columns of the DMD 11 may include 1280×1024, 1280×768, 1280×720, and 1920×1080.

As illustrated in FIG. 2, each mirror group 11*i* is associated with a corresponding microlens 12*i*. It should be noted that FIG. 2 depicts the microlenses 12*i* facing frontward the respective mirror groups 11*i*, for convenience of description. However, as illustrated in FIG. 1, the actual microlenses 12*i* are arranged at diagonal positions with respect to the front of the respective mirror groups 11*i*.

The orientation of each mirror 11*ij* is controlled by the control section C, and each mirror 11*ij* is controlled to face in either a first direction or a second direction. When a mirror faces in the first direction, light L reflects off the mirror and propagates in the negative z-axial direction. This state is referred to as the ON state. When a mirror faces in the second direction, light L reflects off the mirror and propagates in another direction different from the negative z-axial direction. This state is referred to as the OFF state. Thus, by selecting at least one of the mirrors arranged in the matrix pattern and by switching the state of the selected one or ones to the ON state, the DMD 11 forms a desired pattern of the intensity distribution in the irradiation region of reflected light L propagating in the negative z-axial direction.

(Microlens Array and Objective)

The microlens array 12 and the lens 13 are provided downstream of the DMD 11 in this order.

The microlens array 12 is composed of a plurality of microlenses 12*i* arranged in a matrix pattern, and is configured to transmit light L that has been reflected by the DMD 11. As described above, each microlens 12*i* is associated with a corresponding mirror group 11*i*.

Light L having a strength distribution subjected to patterning to have a predetermined pattern with the DMD 11 is projected, by means of the lens 13, on a main face 151 of the sample platform 15 located under the layer of the photo-curable resin R. The lens 13 functions as an objective, and causes light L that has been transmitted through the microlens array 12 to form an image on the main face 151.

(Container, Sample Platform, and Stage)

The container 14, the sample platform 15, and the stage 16 are provided downstream of the DMD 11, the microlens array 12, and the lens 13.

The stage 16 is a three-axis stage that is capable of moving the table in a translational manner in the x-, y-, and z-axial directions. It should be noted that FIG. 1 depicts the stage 16 by showing only the table thereof. It should be noted that the stage 16 is controlled by the control section C. To the table of the stage 16, a support portion configured to support the sample platform 15 is secured.

On the table of the stage 16, the container 14 is situated. Inside the container 14, the sample platform 15 and photo-curable resin R are provided.

The sample platform 15 is disposed inside the container 14, and is supported by the support portion. As described above, the support portion is secured to the table of the stage 16. Thus, when the table of the stage 16 is moved, the container 14, the support portion, and the sample platform 15 are moved in synchronization (moved in an integrated manner). The support portion may be a z-axis stage configured to move the sample platform 15 translationally in the z-axial direction.

A liquid photo-curable resin R is cured into a solid when being irradiated with light L of a dose that exceeds a threshold. The photo-curable resin R may be selected, depending on the purpose of use, from commercially available photo-curable resins for use in optical fabrication.

The stereolithography device 10 uses the free surface technique in which the free surface of a photo-curable resin R is irradiated with light L in a vertically downward direction. Thus, the support portion defines the position of the sample platform 15 on the z-axis in a manner such that the main face 151, which is one of a pair of the main faces and is located on the positive side of the z-axis, is located slightly lower than the free surface. This forms, on the main face 151, a layer of the photo-curable resin R having a predetermined thickness (e.g., not less than 2 μm and not more than 5 μm) (see FIG. 1 and (a) of FIG. 3). It should be noted that the dimensions in the z-axial direction inside the container 14 is exaggerated in FIG. 3. For example, in (a) of FIG. 3, the thickness of the photo-curable resin R defined between the main face 151 and the free surface corresponds to the abovementioned predetermined thickness.

(Control Section)

The control section (example of a controller) C is configured to control the orientation of each of the mirrors 11*ij* in the DMD 11, the power and the pulse width of laser light L emitted by the laser device LA, and the position of the table of the stage 16. As used herein, controlling the orientation of the mirrors 11*ij* in the DMD 11 may also be simply referred to as "controlling the DMD 11". Further, the following will describe how the control section C controls the DMD 11; however, how the control section C controls the laser device LA and the stage 16 will be eliminated.

The control section C is configured to control the DMD 11 so that light L forms an image having a predetermined pattern at each of a plurality of levels that are different in distance from the main face 151 of the sample platform 15.

In the step of optically fabricating the first layer L1 illustrated in (a) of FIG. 3, the control section C controls the DMD 11 so that all the mirrors 11$ij$ are switched to the ON state. This allows the DMD 11 to project light L that forms images in regions R1 to R5 in a position at which the distance (i.e., height) from the main face 151 is 2.5 μm. This position at which the distance from the main face 151 is 2.5 μm is an example of the first level. Further, the pattern made of the regions R1 to R5 is an example of the predetermined pattern.

In the step of optically fabricating the second layer L1 illustrated in (b) of FIG. 3, the control section C controls the DMD 11 so that mirrors 1123, 1132, 1133, 1141, 1142, and 1151 are switched to the ON state. This allows the DMD 11 to project light L that forms images in the regions R3 and R4 in a position at which the distance (i.e., height) from the main face 151 is 7.5 μm. This position at which the distance from the main face 151 is 7.5 μm is an example of the second level. Further, the pattern made of the regions R3 and R4 is an example of the predetermined pattern.

In the step of optically fabricating the second layer L1 illustrated in (c) of FIG. 3, the control section C controls the DMD 11 so that mirrors 1113, 1132, and 1151 are switched to the ON state. This allows the DMD 11 to project light L that forms an image in the region R3 in a position at which the distance from the main face 151 is 12.5 μm. This position at which the distance from the main face 151 is 12.5 μm is an example of the third level. Further, the pattern made of the region R3 is an example of the predetermined pattern.

As described above, light L subjected to patterning to have the predetermined pattern with the DMD 11 is projected, by means of the microlens array 12 and the lens 13, on the main face 151 located under the layer of the photo-curable resin R. Thus, the pattern defined by the ON-state mirrors of the DMD 11 is transferred to the layer of the photo-curable resin R on the main face 151. This fabricates, on the main face 151, an optically fabricated object that has the predetermined pattern.

It should be noted that the control section C, which is a control block of the stereolithography device 10 can be realized by a logic circuit (hardware) provided in an integrated circuit (IC chip) or the like or can be alternatively realized by software.

In the latter case, the stereolithography device 10 includes a computer that executes instructions of a program that is software realizing the foregoing functions. The computer, for example, includes one or more processors and at least one computer-readable storage medium storing the program. The processor of the computer reads and executes the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that one or more embodiments can also be achieved in the form of a computer data signal in which the program is embodied via electronic transmission and which is embedded in a carrier wave.

<Method for Manufacturing Optically Fabricated Object>

Figure 4:
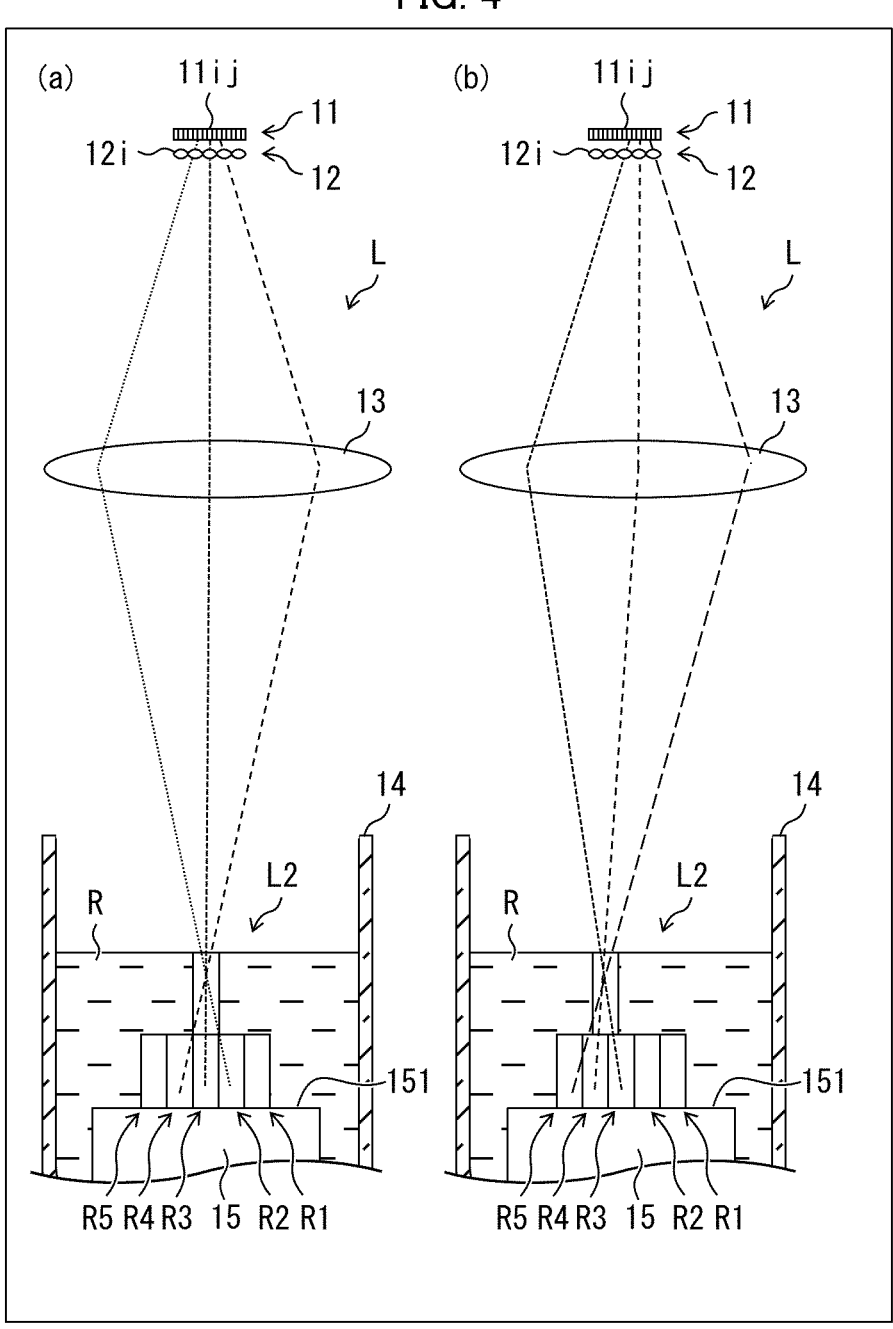
FIG. 4 is a detailed schematic view illustrating the step of optically fabricating the second layer illustrated in (b) of FIG. 3.

The following will describe a method for manufacturing an optically fabricated object performed with use of the abovementioned stereolithography device 10, with reference to FIGS. 3 and 4. As described above, each of (a) to (c) of FIG. 3 is a schematic view illustrating a corresponding one of steps of optically fabricating first to third layers L1 to L3, using the stereolithography device 10. Both (a) and (b) of FIG. 4 are detailed schematic views illustrating the step of optically fabricating the second layer L2 illustrated in (b) of FIG. 3.

The present manufacturing method is configured to manufacture an optically fabricated object by causing light having a predetermined pattern to form an image at each of first to n-th levels (n is an integer that is not less than 2) that are different in distance from the main face 151 of the sample platform 15 located in the photo-curable resin R. The present manufacturing method includes: a controlling step of controlling a digital micromirror device to cause the light to form an image having the predetermined pattern at an i-th level (i is an integer that satisfies 1≤i≤n); and an irradiation step of irradiating the i-th level with the light by using the digital micromirror device controlled in the controlling step, the controlling step and the irradiation step being repeated until i goes from 1 to n, to fabricate at least part of the optically fabricated object. In one or more embodiments, n=3 is employed. However, n is not limited to three, but may be determined as appropriate depending on the dimensions of the optically fabricated object and the smoothness required of the surface.

Further, the present manufacturing method may be used to manufacture the entirety of the optically fabricated object, or alternatively, may be used to form part of the optically fabricated object. For example, it is assumed that n=10 is employed and an optically fabricated object having a predetermined thickness (e.g., 5 μm) is obtained by causing light to form an image at each level. In a case in which the predetermined thickness is 5 μm, once the present manufacturing method is performed, an optically fabricated object having a thickness of 50 μm is obtained. Thus, an optically fabricated object having a total thickness of not more than 50 μm can be manufactured by performing the present manufacturing method once. On the other hand, an optically fabricated object having a total thickness of more than 50 μm can be manufactured by performing the present manufacturing method multiple times. In this case, the height (the position in the z-axial direction) of the table of the stage 16 may be lowered by 50 μm every time the present manufacturing method is performed.

It should be noted that a conventional method for manufacturing an optically fabricated object is configured to lower the height of the table of the stage 16 by a predetermined value (e.g., 5 μm) every time a layer is fabricated optically. The present manufacturing method may be combined with such a conventional manufacturing method to manufacture a single optically fabricated object.

As illustrated in (a) of FIG. 3, the amount of the photo-curable resin R held in the container 14 is controlled so that the free surface of the photo-curable resin R is positioned above the main face 151 of the sample platform 15. In (a) of FIG. 3, the photo-curable resin R present on the main face 151 has a thickness of not less than 2 μm and not more than 5 μm. In one or more embodiments, the following will describe a case in which the thickness is 5 μm.

In a step of optically fabricating the first layer L1 (see (a) of FIG. 3), the control section C controls the DMD 11 so that all the mirrors 11$ij$ are switched to the ON state. In this state, light L reflected by the respective mirrors 11$ij$ forms an image at an intermediate in the height direction between the main face 151 and the free surface of the photo-curable resin R present on the main face 151. As mentioned above, the photo-curable resin R present on the main face 151 has a thickness of 5 μm. Thus, the control section C controls the DMD 11 so that light L reflected by the mirrors 11*ij* forms an image at the height of 2.5 μm above the main face 151. That is, the control section C switches all the mirrors 11*ij* to the ON state.

Specifically, light L reflected by the mirror group 111, which is located farthest on the negative side in the x-axis, forms an image in a region R1 of the main face 151, which is located farthest on the positive side in the x-axis, whereas light L reflected by the mirror group 115, which is located farthest on the positive side in the x-axis, forms an image in a region R5 of the main face 151, which is located farthest on the negative side in the x-axis. Light reflected by each of the mirror groups 112, 113, and 114, which are located between the mirror group 111 and the mirror group 115, forms an image in a corresponding one of regions R2, R3, and R4, which are located between the region R1 and the region R5. The position at which the distance from the main face 151 is 2.5 μm is an example of the first level. Further, the pattern made of the regions R1 to R5 is an example of the predetermined pattern.

Thus, since the photo-curable resin R present in the regions in which the light L forms the image is cured, the first layer L1, which is a layered optically fabricated object having the predetermined pattern when viewed from above and having a thickness of 5 μm, is fabricated.

Next, as illustrated in (b) of FIG. 3, the photo-curable resin R is added to the container 14 so that the level of the free surface of the photo-curable resin R rises by 5 μm, compared to the level illustrated in (a) of FIG. 3.

In the step of optically fabricating the second layer L2 (see (b) of FIG. 3), the control section C controls the DMD 11 so that the mirrors 1123, 1132, 1133, 1141, 1142, and 1151 are switched to the ON state. In this state, light L reflected by the mirrors 1123, 1132, and 1141 forms an image at a region R3 which is slightly lower than the free surface of the photo-curable resin R present on the main face 151. In addition, light L reflected by the mirrors 1133, 1142, and 1151 forms an image at a region R4 which is slightly lower than the free surface of the photo-curable resin R present on the main face 151. Compared to the case of the step of optically fabricating the first layer L1, the level of the free surface of the photo-curable resin R rises by 5 μm in the step of optically fabricating the second layer L2. Thus, the control section C controls the DMD 11 so that light L reflected by the mirrors 11*ij* forms an image at the height of 7.5 μm above the main face 151. That is, the control section C switches the mirrors 1123, 1132, 1133, 1141, 1142, and 1151 to the ON state.

Thus, since the photo-curable resin R present in the regions in which the light L forms the image is cured, the second layer L2, which is a layered optically fabricated object having the predetermined pattern when viewed from above and having a thickness of 5 μm, is fabricated. The position at which the distance from the main face 151 is 7.5 μm is an example of the second level. Further, the pattern made of the regions R3 and R4 is an example of the predetermined pattern.

It should be noted that the position at which light L reflected by the mirrors 1123, 1132, and 1141 forms an image coincides with the region R3 (see (a) of FIG. 4); however, the position at which light L reflected by the mirrors 1133, 1142, and 1151 forms an image is slightly displaced in positive x-axial direction with respect to the region R4 (see (b) of FIG. 4). This displacement occurs because the DMD 11 is schematically depicted as the 15×15 (hereinafter, referred to as "15×15") mirrors 11*ij*. Actually, the DMD 11 constituted by a large number of mirrors that includes much more than 15 rows and 15 columns is used, so that such a displacement as illustrated in (b) of FIG. 4 can be dissolved and it is possible to optically fabricate an optically fabricated object in a desired region. Examples of the number of rows and the number of columns of the DMD 11 may include 1280×1024, 1280×768, 1280×720, and 1920×1080.

Next, as illustrated in (c) of FIG. 3, the photo-curable resin R is added to the container 14 so that the level of the free surface of the photo-curable resin R rises by 5 μm, compared to the level illustrated in (b) of FIG. 3.

In the step of optically fabricating the third layer L3 (see (c) of FIG. 3), the control section C controls the DMD 11 so that the mirrors 1113, 1132, and 1151 are switched to the ON state. In this state, light L reflected by the mirrors 1113, 1132, and 1151 forms an image at a region R3 which is slightly lower than the free surface of the photo-curable resin R present on the main face 151. Compared to the case of the step of optically fabricating the second layer L2, the level of the free surface of the photo-curable resin R rises by 5 μm in the step of optically fabricating the third layer L3. Thus, the control section C controls the DMD 11 so that light L reflected by the mirrors 11*ij* forms an image at the height of 12.5 μm above the main face 151. That is, the control section C switches the mirrors 1113, 1132, and 1151 to the ON state.

Thus, since the photo-curable resin R present in the region in which the light L forms the image is cured, the third layer, which is a layered optically fabricated object having the predetermined pattern when viewed from above and having a thickness of 5 μm, is fabricated. The position at which the distance from the main face 151 is 12.5 μm is an example of the third level. Further, the pattern made of the region R3 is an example of the predetermined pattern.

As described in the foregoing, use of the stereolithography device 10 allows fabrication of a three-dimensional optically fabricated object because the height, above the main face 151, of the position at which light L forms an image can be variable without the use of a z-axis stage for raising or lowering the sample platform.

It should be noted that, in one or more embodiments, the optical fabrication step has been described by taking, as an example, a case in which an optically fabricated object is fabricated on a flat plane, such as the main face 151 and the surface of the first layer L1. However, the optical fabrication using one or more embodiments may be performed not only on the flat plane, but also on a curved surface and a surface of a step portion.

One or more embodiments can also be expressed as follows:

An optical fabrication device in accordance with one or more embodiments includes: a light source configured to emit light for curing a photo-curable resin; a digital micromirror device configured to reflect the light to project a predetermined pattern; a microlens array disposed downstream of the digital micromirror device and configured to transmit the light that has been reflected by the digital micromirror device; an objective disposed downstream of the microlens array and configured to cause the light that has been transmitted through the microlens array to form an image; a container configured to hold a photo-curable resin; a sample platform disposed inside the container; and a control section configured to control the digital micromirror device to cause the light to form an image having a predetermined pattern at each of a plurality of levels that are different in distance from a main face of the sample platform.

With this configuration, it is possible to change a distance between the surface of the sample platform and a position at which light that has been reflected by the digital micromirror device forms an image, by appropriately adjusting the pattern of the light reflected by the digital micromirror device. Thus, the present optical fabrication device is capable of fabricating a three-dimensional optically fabricated object, without the use of a stage for raising or lowering a sample platform.

An optical fabrication device in accordance with one or more embodiments employs, in addition to the abovementioned configuration of the optical fabrication device in accordance with Aspect 1, a configuration in which the light source is a laser light source configured to emit the light (i) having a wavelength corresponding to half of an energy of light that causes the photo-curable resin to be cured when the photo-curable resin absorbs the light and (ii) having a pulse width on an order of femtoseconds.

With this configuration, it is possible to use the two-photon polymerization in curing the photo-curable resin. Thus, the present optical fabrication device can fabricate a finer optically fabricated object.

A manufacturing method in accordance with one or more embodiments is a manufacturing method for manufacturing an optically fabricated object by causing light having a predetermined pattern to form an image at each of first to n-th levels (n is an integer that is not less than 2) that are different in distance from a main face of a sample platform located in the photo-curable resin. The present manufacturing method includes: a controlling step of controlling a digital micromirror device to cause the light to form an image having the predetermined pattern at an i-th level (i is an integer that satisfies 1≤i≤n); and an irradiation step of irradiating the i-th level with the light by using the digital micromirror device controlled in the controlling step, the controlling step and the irradiation step being repeated until i goes from 1 to n, to fabricate at least part of the optically fabricated object.

With this configuration, it is possible to achieve similar effects to those achieved by the optical fabrication device in accordance with Aspect 1 described above.

[Supplementary Notes]

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 Stereolithography device
LA Laser device (light source)
11 Digital micromirror device (DMD)
12 Microlens array
13 Lens (objective)
14 Container
15 Sample platform
151 Main face
C Control section
The invention claimed is:
1. An optical fabrication device comprising:
a light source that emits light and cures a photo-curable resin;
a digital micromirror device that reflects the light and projects a predetermined pattern;
a microlens array that is disposed downstream of the digital micromirror device and that transmits the light that has been reflected by the digital micromirror device;
an objective that is disposed downstream of the microlens array and that causes the light that has been transmitted through the microlens array to form an image;
a container that holds the photo-curable resin;
a sample platform disposed inside the container; and
a controller that controls the digital micromirror device and causes the light to form an image having the predetermined pattern at each of levels that are different in distance from a main face of the sample platform, wherein
the light source is a laser light source, and
the light, emitted by the laser light source, has:
a wavelength corresponding to half of an energy of light that causes the photo-curable resin to be cured when the photo-curable resin absorbs the light, and
a pulse width on an order of femtoseconds.
2. A method for manufacturing an optically fabricated object comprising:
controlling a digital micromirror device to cause light to form an image having a predetermined pattern at an i-th level (i is an integer that satisfies 1≤i≤n); and
irradiating the i-th level with the light by using the controlled digital micromirror device, wherein
the controlling and the irradiating are repeated until i goes from 1 to n, to fabricate at least part of the optically fabricated object,
each of first to n-th levels is different in distance from a main face of a sample platform located in a photo-curable resin,
the digital micromirror device includes a plurality of mirrors arranged in a matrix pattern, and
in the controlling, a level irradiated with the light in the irradiating is changed among the first to n-th levels by switching mirrors used in the irradiating among the plurality of mirrors included in the digital micromirror device.

* * * * *